US007769145B2

(12) United States Patent
Melideo

(10) Patent No.: US 7,769,145 B2
(45) Date of Patent: *Aug. 3, 2010

(54) TELEPHONE CALLING INTERFACE

(75) Inventor: John Melideo, Westlake Village, CA (US)

(73) Assignee: Q Tech Systems, Inc., Westlake Village, CA (US)

( * ) Notice: Subject to any disclaimer, the term of this patent is extended or adjusted under 35 U.S.C. 154(b) by 1847 days.

This patent is subject to a terminal disclaimer.

(21) Appl. No.: 10/821,701

(22) Filed: Apr. 9, 2004

(65) Prior Publication Data

US 2004/0234049 A1 Nov. 25, 2004

Related U.S. Application Data

(63) Continuation-in-part of application No. 10/691,982, filed on Oct. 22, 2003, now Pat. No. 7,103,010, and a continuation-in-part of application No. 10/614,394, filed on Jul. 3, 2003, now Pat. No. 7,434,175.

(60) Provisional application No. 60/471,535, filed on May 19, 2003.

(51) Int. Cl.
H04M 1/64 (2006.01)
H04M 7/00 (2006.01)
G06F 15/16 (2006.01)

(52) U.S. Cl. ............ 379/88.17; 379/219; 709/218
(58) Field of Classification Search ......... 379/88.17; 709/219
See application file for complete search history.

(56) References Cited

U.S. PATENT DOCUMENTS 5,452,289 A 9/1995 Sharma et al.
5,483,352 A 1/1996 Fukuyama
5,790,638 A 8/1998 Bertacchi
5,867,562 A 2/1999 Scherer
5,926,754 A 7/1999 Cirelli
5,944,791 A 8/1999 Scherpbier
5,956,483 A * 9/1999 Grate et al. .............. 709/203

(Continued)

FOREIGN PATENT DOCUMENTS

WO WO 00/05679 2/2000

OTHER PUBLICATIONS

C. J. Weigand, Indispensible software on-line, Home Office Computing, April 1992, v10 n4 p. 20.

(Continued)

Primary Examiner—Joseph T Phan
(74) Attorney, Agent, or Firm—SoCal IP Law Group LLP; Steven C. Sereboff; Mark A. Goldstein

(57) ABSTRACT

A telephone calling interface is disclosed. The telephone calling interface may be implemented as a toolbar within an Internet web browser. The toolbar may identify telephone numbers included in a web page requested by a user of the Internet web browser and conspicuously display the identified telephone numbers when the web page is displayed. The toolbar may recognize activation by the user of one of the conspicuously displayed identified telephone numbers included in the web page as an activated telephone number and initiate a telephone call between a predefined telephone number and the activated telephone number. The method may be executed on a computing device such as, for example, a personal computer.

34 Claims, 6 Drawing Sheets

U.S. PATENT DOCUMENTS

| | | | |
|---|---|---|---|
| 6,011,794 A | 1/2000 | Mordowitz et al. | |
| 6,028,917 A | 2/2000 | Creamer et al. | |
| 6,031,836 A | 2/2000 | Haserodt | |
| 6,069,890 A | 5/2000 | White et al. | |
| 6,072,865 A | 6/2000 | Haber | |
| 6,108,704 A * | 8/2000 | Hutton et al. | 709/227 |
| 6,115,461 A | 9/2000 | Baiyor | |
| 6,130,933 A | 10/2000 | Milislavsky | |
| 6,144,667 A | 11/2000 | Doshi | |
| 6,157,954 A * | 12/2000 | Moon et al. | 709/228 |
| 6,185,194 B1 | 2/2001 | Musk | |
| 6,249,576 B1 | 6/2001 | Sassin | |
| 6,263,365 B1 | 7/2001 | Scherpbier | |
| 6,275,490 B1 | 8/2001 | Mattaway et al. | |
| 6,337,858 B1 | 1/2002 | Petty et al. | |
| 6,385,191 B1 | 5/2002 | Coffman | |
| 6,445,468 B1 | 9/2002 | Tsai | |
| 6,470,079 B1 | 10/2002 | Benson | |
| 6,535,909 B1 | 3/2003 | Rust | |
| 6,600,503 B2 | 7/2003 | Stautner et al. | |
| 6,665,375 B1 | 12/2003 | Forlenza | |
| 6,670,968 B1 | 12/2003 | Schilit | |
| 6,690,663 B1 | 2/2004 | Culver | |
| 6,690,672 B1 * | 2/2004 | Klein | 370/401 |
| 6,691,302 B1 | 2/2004 | Skrzynski | |
| 6,707,811 B2 | 3/2004 | Greenberg et al. | |
| 6,731,630 B1 | 5/2004 | Schuster | |
| 6,834,048 B1 * | 12/2004 | Cho et al. | 370/356 |
| 6,870,828 B1 | 3/2005 | Giordano | |
| 6,938,067 B2 * | 8/2005 | Hershenson | 709/202 |
| 6,954,524 B2 | 10/2005 | Gibson | |
| 6,973,091 B1 | 12/2005 | Hester | |
| 6,996,221 B1 | 2/2006 | Baiyor | |
| 7,035,384 B1 | 4/2006 | Scherer | |
| 7,058,356 B2 | 6/2006 | Slotznick | |
| 7,069,291 B2 * | 6/2006 | Graves et al. | 709/201 |
| 7,092,496 B1 | 8/2006 | Maes | |
| 7,106,851 B2 | 9/2006 | Tang | |
| 7,110,368 B2 | 9/2006 | Perry | |
| 7,170,995 B2 | 1/2007 | Johnson | |
| 7,188,175 B1 * | 3/2007 | McKeeth | 709/227 |
| 7,203,186 B1 | 4/2007 | Fuller | |
| 7,215,744 B2 | 5/2007 | Scherer | |
| 7,222,304 B2 | 5/2007 | Beaton | |
| 7,249,045 B2 * | 7/2007 | Lauffer | 705/8 |
| 7,257,201 B2 | 8/2007 | Singh | |
| 7,295,836 B2 * | 11/2007 | Yach et al. | 455/415 |
| 7,366,683 B2 * | 4/2008 | Altberg et al. | 705/14.64 |
| 7,424,442 B2 * | 9/2008 | Wong et al. | 705/14.68 |
| 7,428,497 B2 * | 9/2008 | Agarwal et al. | 705/14.54 |
| 7,453,998 B2 * | 11/2008 | Jacob et al. | 379/114.05 |
| 7,505,920 B2 * | 3/2009 | Agarwal et al. | 705/14.73 |
| 7,509,428 B2 * | 3/2009 | McKeeth | 709/227 |
| 7,657,013 B2 * | 2/2010 | Lurie et al. | 379/114.1 |
| 2001/0038624 A1 | 11/2001 | Greenberg | |
| 2001/0055951 A1 | 12/2001 | Slotznick | |
| 2002/0083093 A1 | 6/2002 | Goodisman | |
| 2002/0089938 A1 | 7/2002 | Perry | |
| 2002/0104090 A1 | 8/2002 | Stettner | |
| 2002/0128036 A1 | 9/2002 | Yach | |
| 2002/0164000 A1 * | 11/2002 | Cohen et al. | 379/88.17 |
| 2003/0014754 A1 | 1/2003 | Chang | |
| 2003/0033375 A1 | 2/2003 | Mitreuter | |
| 2003/0050045 A1 | 3/2003 | Kennedy | |
| 2003/0079024 A1 | 4/2003 | Hough et al. | |
| 2003/0140091 A1 * | 7/2003 | Himmel et al. | 709/203 |
| 2003/0185232 A1 | 10/2003 | Moore et al. | |
| 2003/0228011 A1 | 12/2003 | Gibson | |
| 2004/0122810 A1 | 6/2004 | Mayer | |
| 2004/0141599 A1 | 7/2004 | Tang | |
| 2004/0198328 A1 | 10/2004 | Brandenberger | |
| 2004/0240642 A1 | 12/2004 | Crandell et al. | |
| 2004/0252820 A1 | 12/2004 | Faber | |
| 2005/0289471 A1 | 12/2005 | Thompson et al. | |

OTHER PUBLICATIONS

USPTO, Notice of Allowability for U.S. Appl. No. 10/614,394, filed Jul. 3, 2003 entitled Displaying Telephone Numbers as Active Objects, Mail Date Jul. 18, 2008.

Alcatel, "US West liberates Internet from PCs with new Alcatel 'Web-Phone'", M2 Presswire, May 11, 1999.

Fichter, Darlene, "Click to talk: Web phones spell opportunIPy for libraries", Online Inc., vol. 25, No. 1, p. 48-51, Jan./Feb. 2001.

Schilit, Bill N. et al., "m-links: An infrastructure for very small internet devices", Proc. of the 7th Annual Int'l Conference on Mobile Computing and Networking, Rome, Italy, ACM Press, p. 122-131, Jul. 2001.

Rosenberg et al., "SIP event packages for call leg and conference state", http://www.jdrosen.net/sip_callpkg.html, Mar. 1, 2002.

Porter, Brad, "Call control requirements in a voice browser framework", http://www.w3.org/TR/call-control-reqs/, Apr. 13, 2001.

* cited by examiner

TELEPHONE CALLING INTERFACE

RELATED APPLICATION INFORMATION

This application is a continuation in part of Provisional Patent Application No. 60/471,535 filed May 19, 2003, which is incorporated herein by reference.

This application is a continuation in part of application Ser. No. 10/614,394 filed Jul. 3, 2003 entitled "Displaying Telephone Numbers as Active Objects" which is incorporated herein by reference.

This application is a continuation in part of application Ser. No. 10/691,982 filed Oct. 22, 2003 entitled "Application Independent Telephone Call Initiation" which is incorporated herein by reference.

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by any one of the patent disclosure as it appears in the Patent and Trademark Office patent files or records, but otherwise reserves all copyright and trade dress rights whatsoever.

BACKGROUND OF THE INVENTION

1. Field of the Invention

The invention relates to initiation of telephone calls from a client device connected to a network.

2. Description of Related Art

A graphical user interface or GUI is a graphical representation or presentation of information. Various options that provide a computer user with the ability to manipulate information and data may be presented in a GUI that may consist of a window or menu. For example, customer information such as a customer name, contact name, address, and zip code may be presented to a user in a visually appealing manner such that the words "Customer Name" appear next to a text field box with a space for a name, the words "Contact Name" appear next to a text field box with a space for a name, the word "Address" appears next to a text field box with a space for an address, and the words "Zip Code" appear next to a text field box with a space for a zip code. The field names (i.e., customer name, contact name, address, and zip code) may be displayed in a specific font or color with the text field boxes (or the information in the text field boxes) in the same or different font or color. Thus, the GUI provides for the display and receipt of information.

Commonly, a GUI representation of information is displayed in a window with several standard components that are displayed regardless of the type, style, or content of the information to be displayed by the GUI. The top of the window may have a title bar for which a title may be specified. Below the title bar may be a menu bar. The menu bar may be associated with various capabilities. The menu bar may have various submenus. Each submenu may be a menu itself or a command that can be selected by the user.

A "web browser" is an application program used for viewing files and navigating through linked files communicated over the Internet. Example web browsers include Netscape Navigator and Microsoft Internet Explorer. The web files may include hyperlinks which, when activated by the user cause a corresponding web page to be displayed. Hyperlinks may also cause other events, such as the launching of programs or routines (e.g., causing an email program to open a blank email message with a specified "to" address). The web files may be communicated over the Internet using the hyper-text transfer protocol (HTTP). The web files may be in the hyper-text markup language (HTML) format.

Efforts have been made in integrating the Web with telephony applications. One such popular application is the placing of telephone calls from a personal computer to a regular telephone. A user can place a call to a regular telephone from the web using Dialpad from Dialpad Communications, Inc. or Net2Phone from Net2Phone, Inc. In these and similar applications, to initiate a call a user must manually enter a telephone number or pick a telephone number from a structured list stored by and only available from the dialing application.

Some companies, in conjunction with their sales and customer service efforts, have added a "call me" or "call-back" function to their web sites. With these functions, a user who browses to the company's web site may then manually enter the user's telephone number and other information into a web page. The company's computers direct the customer service request to a customer service agent and initiate a telephone call to the user.

DETAILED DESCRIPTION

Throughout this description, the embodiments and examples shown should be considered as exemplars, rather than limitations on the apparatus and methods of the invention.

A System

Figure 1:
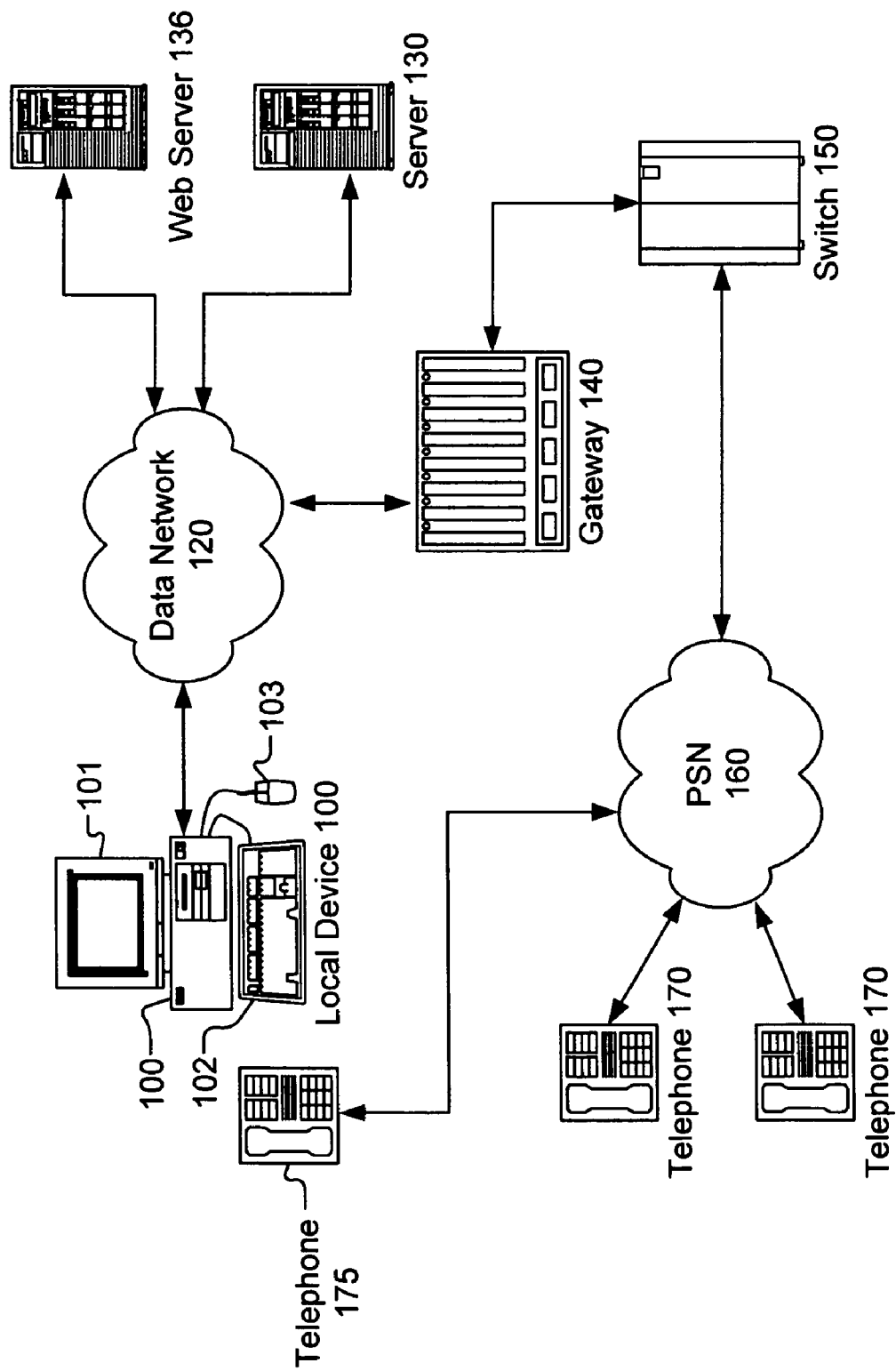
FIG. 1 is a block diagram of an environment in accordance with the invention.

Referring now to FIG. 1, there is shown a block diagram of an environment in accordance with the invention. The system includes a local device 100, a data network 120, a server 130, a web server 136, a gateway 140, a switch 150, a public switched network (PSN) 160 and plural telephones 170.

The local device 100 may comprise a general purpose computer. The local device 100 may be, for example, a personal computer running a Microsoft Windows operating system. The local device 100 may include an output device, such as a display 101, and an input device, such as a keyboard 102 and/or a pointing device 103 (e.g., mouse, track ball, light pen, and data glove). The local device 100 may be a computing device such as a personal computer, computer workstation, server, portable computer, notebook computer, personal digital assistant (PDA), computing tablet, two-way messaging device (e.g., Blackberry™), smart display terminal, personal video recorder, set-top box, and others. The local device 100 connects with and communicates on the data network 120 and includes an interface therefore. The local device 100 may include a network interface card (NIC) that may support network communications. The network communications supported may include the transmission control protocol/internet protocol (TCP/IP) and other communications protocols. The local device 100 may comprise an assembly of devices, such as a television and a set-top box which interfaces to the data network 120.

The local device 100 and the server 130 may include software and/or hardware for providing the functionality and features of the invention. The local device 100 and the server 130 may therefore include one or more of: logic arrays, memories, analog circuits, digital circuits, software, firmware, field programmable gate arrays (FPGAs), application specific integrated circuits (ASICs), programmable logic devices (PLDs), programmable logic arrays (PLAs), and processors such as microprocessors. The hardware and firmware components of the local device 100 and the server 130 may include various specialized units, circuits, software and interfaces for providing the functionality and features of the invention. The invention may be embodied in whole or in part in software which operates on the local device 100 and may also operate on or in conjunction with the server 120. When implemented in software, the invention may be an application program, an applet (e.g., a Java applet), a browser plug-in, a COM object, a dynamic linked library (DLL), a script, one or more subroutines, an operating system component or service, or a terminate and stay resident program (TSR). The hardware and software of the invention and its functions may be distributed such that some components are performed by the local device 100, the server 130, and others.

The data network 120 provides network communications support for the local device 100 to interact with other devices, including the server 130, the web server 136, and the gateway 140. The data network 120 is packet-switched and may comprise one or more public and/or private bi-directional data networks. The data network 120 may be, for example the Internet and may utilize the Internet Protocol.

The web server 136 communicates over the data network 120 and serves Internet web pages and related data to local device 100 and other computing devices. The web server 136 may be or include software to be one or more of an application server, graphics server, database server, transaction server, and others. The web server 136 is representative of any source of web pages available to the local device 100. Thus, for example, the web server 136 could be accessible from the Internet, or it could be a part of an intranet. The web server 136 represents any number of web servers.

The server 130 and the web server 136 each include a communications interface that may be a NIC. The communications interface may include hardware and software and may include support for a TCP/IP stack. The communications interface serves as a common interface for hardware and software of the server 130 and the web server 136 to allow them to communicate with and over the data network 120. The functionality of the server 130 and the web server 136 may be combined as a single server. In addition, other servers that provide telephone and other directories, databases and/or other services may be coupled with the network 120. Further, the server 130 and/or the web server 136 may provide or include telephone and other directories, databases and/or other services.

The PSN 160 is a common carrier network which provides telephone service between users. The PSN 10 is a circuit switching network, an IP telephony network, or a combination thereof. The PSN 160 may be the public switched telephone network (PSTN). The PSN 160 may operate according to standards such as, for example, Common Channel Interoffice Signaling (CCIS), Common Channel Signaling 7 (C7), Signaling System 6 (SS6), and Signaling System 7 (SS7) standards.

The telephones 170 may be ordinary analog telephones connected to the PSN. The telephones 170 may be digital devices for providing voice communications, such as, for example, Session Initiation Protocol (SIP) enabled devices or telephone sets connected through a PBX. The telephones 170 may also be wireless voice communications devices such as cellular telephones. The telephone 175 is of the same type as the telephones 170. There may be one or more telephones 175 located proximate to the local device 100, or in a location under common control of the user of the local device 100.

The switch 150 may be a voice switch, circuit switch and/or an IP switch, and may be compliant with standards such as SS6 or SS7. The switch 150 is compatible with the PSN 160, and has the ability to set up and tear down telephone connections in the PSN 160.

The gateway 140 interfaces between the packet-switched data network 120 and the switch 150. The gateway 140 may be a signaling gateway platform (SGP), which is an intelligent service exchange node that integrates services between circuit switched and packet switched networks. The gateway 140 may be integrated into the PSN 160 or the switch 150.

Figure 2:
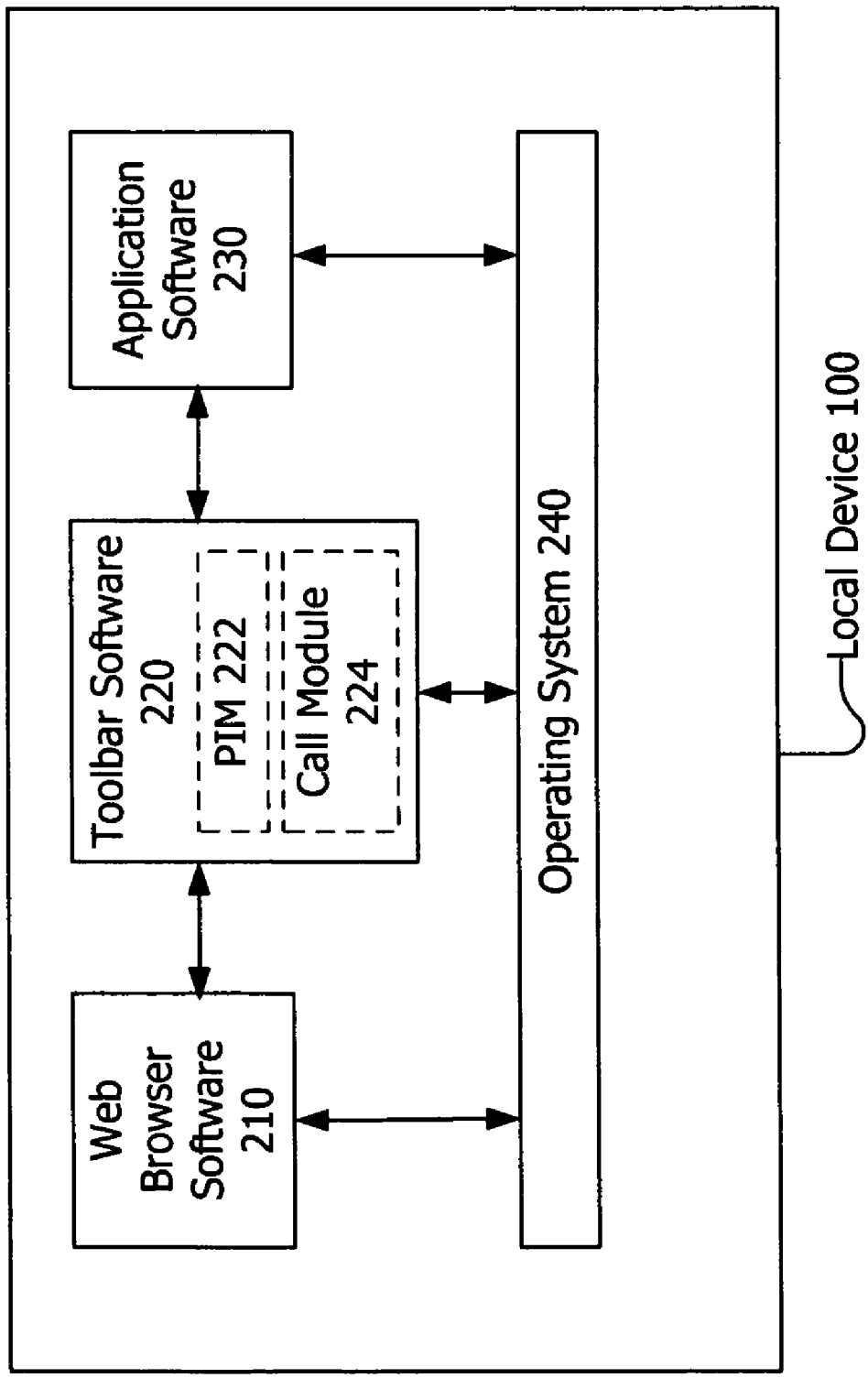
FIG. 2 is a block diagram of a local device in accordance with the invention.

Referring now to FIG. 2, there is shown a block diagram of the local device 100. The local device 100 includes web browser software 210, toolbar software 220, and an operating system 240. The local device 100 may also include application software 230 such as a word processing program, an email client, a spreadsheet and other programs. The local device 100 may include more than one each of components 210 and 230, although only one of each is shown. For example, where the local device 100 is a personal computer, there may be as many as a dozen or more application programs.

The toolbar software 220 is computer software disposed at the topmost layer of the Open Systems Interconnection (OSI) Reference Model (i.e., the application layer) that calls or otherwise accesses services of the operating system 240 and performs tasks for a user. The toolbar software 220 may be an executable software program that is a plug-in that executes in relationship with the web browser software 210. The toolbar software 210 may be object code, may be a Java applet, a JavaScript, a COM object, a dynamic linked library (DLL), one or more subroutines, an operating system component or service, or a terminate and stay resident program (TSR). The toolbar software 220 may be network-based or may be part of an integrated package. The toolbar software 220 may comprise one or more files, modules or other parts.

The toolbar software 220 may include personal information manager (PIM) software 222 that allows a user to maintain an address book, manage appointments, and perform other tasks. PIM software may be software that allows for creation and/or management of an address book. The PIM software may also allow for calendar and date book creation and maintenance. The toolbar software 220 may include a call module 224 which is used to establish telephone calls between a user and a specified phone number.

Each of the toolbar software 200, the PIM software 222 and the call module 224 may be separate operating modules or units, may be combined as a single operating unit, or may be comprised of additional operating units (not shown). The toolbar software 220 may be included in the web browser software 210. That is, the web browser software 210 may include software that achieves the functionality of the toolbar software 220, and/or may include software that achieves the functionality of the PIM software 222 and the call module 224.

In the ordinary course of its operation, the toolbar software 220 displays a toolbar pane in a web browser window displayed by the web browser software 210. The toolbar software 220 may identify telephone numbers included in a web page displayed by the web browser software 220. The toolbar software 220 may evaluate whether the telephone number included in a web page displayed by the web browser software 220 is included in a contact information entry in PIM 222 or in a contact information entry included in or prepared and stored by a contact manager, address book, or other application software 230. The toolbar software 220 may display any found telephone number in the toolbar pane. The toolbar software 220 may alter the display of a telephone number identified in a web page displayed by the web browser software to make the telephone number conspicuous. The alteration may be highlighting with a color, inverting the color, changing the color, flashing the telephone number, underlining, making bold, changing the font type, and others. The kind of alteration and attributes of the alteration (such as, for example, color) may be user customizable.

Alternatively, the toolbar software 220 may identify other information associated with a telephone number that is included in a web page displayed by the web browser software 220. This alternative is useful, for example, for PIMs which have peoples' names or companies' names associated with a telephone number. For convenience, the names and other information associated with a telephone number are referred to as "associated data."

The toolbar software 220 may evaluate whether the any information included in a web page displayed by the web browser software 220 is included in a contact information entry in PIM 222 included in the toolbar software and/or in a contact information entry included in or prepared and stored by a contact manager or other application software 230 external to the toolbar software 220. This contact information is the associated data. The toolbar software 220 may alter the display by the web browser of associated data to make it conspicuous. The toolbar software 220 may display found associated data in the toolbar pane.

The term "associated information" is not limited to names. For example, PIMs and contact management databases typically store records comprising a contact's name and one or more telephone numbers for the contact. In such a case, it may be desirable to provide streamlined activation of the associated telephone number if the user activates a display of the contact's name. In this example, the contact's name is the associated data. Associated data includes, for example, names of people, company names, school names, organization names, mailing addresses, email addresses, and others.

One or more items of associated data may correspond with a telephone number. The correspondence may be achieved through a "phone number object." The phone number object may include one or more telephone numbers. For example, each telephone number in a contact information entry may correspond to a single object. Alternatively, each contact information entry may have a single phone number object for all of its telephone numbers. Alternatively, there may be a single phone number object for all telephone numbers identified by the local device 100, or for all telephone numbers for a given application program. Other alternatives may be implemented within the scope of the invention.

The phone number object may include the telephone number and/or may include a reference to the telephone number within the contact information entry. The phone number object is defined such that the telephone number is "activatable" as described herein.

The phone number object may be viewed as including "hooks" for allowing initiation of telephone calls using the corresponding telephone number. The phone number object therefore is a shorthand for an attachment between a displayed telephone number and telephone call initiation functions. Thus, the phone number object may represent, for example, a flag in a data structure which is used to indicate performance of a separate subroutine. Although the phone number object may be considered as an "object" in the sense of object-oriented programming, the phone number object may transcend the limitations of object-oriented programming.

The operating system 240 is the software that runs the local device 100. The operating system 240 interfaces with the local device's hardware, provides an environment and an interface for users, carries out (executes) user commands and program instructions, and provides input and output, memory and storage, file and directory management capabilities. The operating system 240 provides services to the toolbar software 220, and also provides an interface between higher level entities such as the toolbar software 220 and lower level entities such as a display driver and network communications software. The operating system 240 may have communications software, display drivers, and/or other drivers and software incorporated therein and/or associated therewith. The operating system 240 may be a version of, for example, Microsoft Windows, Apple Mac OS, Unix, Linux, and others.

Figure 3:
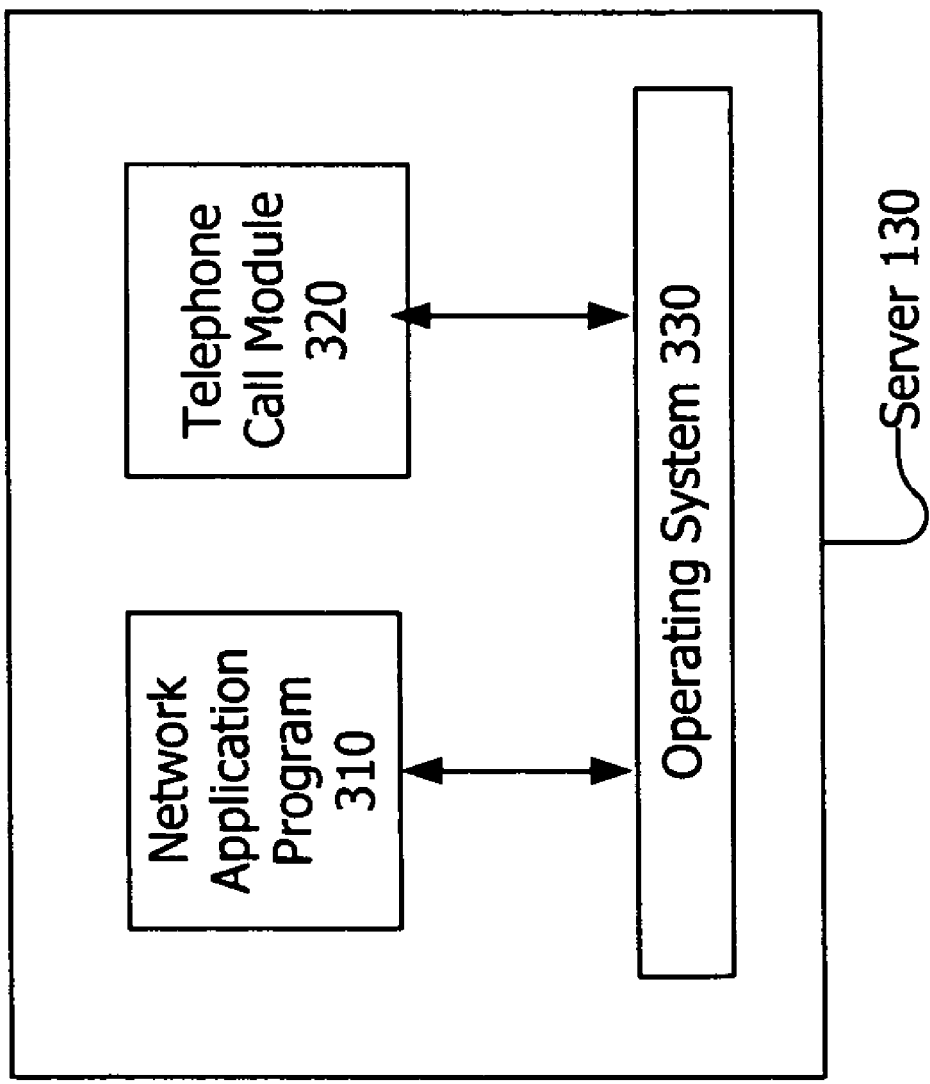
FIG. 3 is a block diagram of a server computer in accordance with the invention.

Referring now to FIG. 3, there is shown a block diagram of the server 130. The server 130 includes a network application program 310, a telephone call module 320, and an operating system 330. The operating system 330 may be a version of, for example, Microsoft Windows, Apple Mac OS, Linux, and others. The server 130 may include more than one each of these components 310, 320, 330, although only one of each is described herein. For example, the server 130 may support many network application programs.

The network application program 310 is a self-contained body of computer software disposed at the topmost layer of the OSI Reference Model, the application layer. The network application program 310 calls services of the operating system 330 and performs at the request of devices on the network. The network application program 310 may be stand-alone, distributed, or part of an integrated package. The network application program 310 may comprise one or more files, modules or other parts. The network application program 310 may be, for example, web server software, electronic mail server software, and file transfer protocol (FTP) server software.

The telephone call module 320 may itself be or include a network application program like network application program 310. Alternatively, the telephone call module 320 may be, for example, an applet (e.g., a Java applet), a plug-in, a COM object, a DLL, a script, one or more subroutines, an operating system component or service, or a TSR program. The telephone call module 320 may be stand-alone, distributed, or part of an integrated package. The telephone call module 320 may comprise one or more files, modules or other parts. The telephone call module 320 may comprise software distinct from the network application program 310 and may operate apart from the network application program 310.

The operating system 330 executes on the server 130 to provide an interface for application programs to the server's hardware and other functionality, executes commands and program instructions received from application and other programs, and provides input and output, memory and storage, file and directory management capabilities to users and to application and other programs. The operating system 330 provides services to the network application program 310 and the telephone call module 320, and also provides an interface between higher level entities such at the network application program 310 and the telephone call module 320 to lower level entities such as a display driver, network communications software, and a communications interface.

Methods

Figure 4:
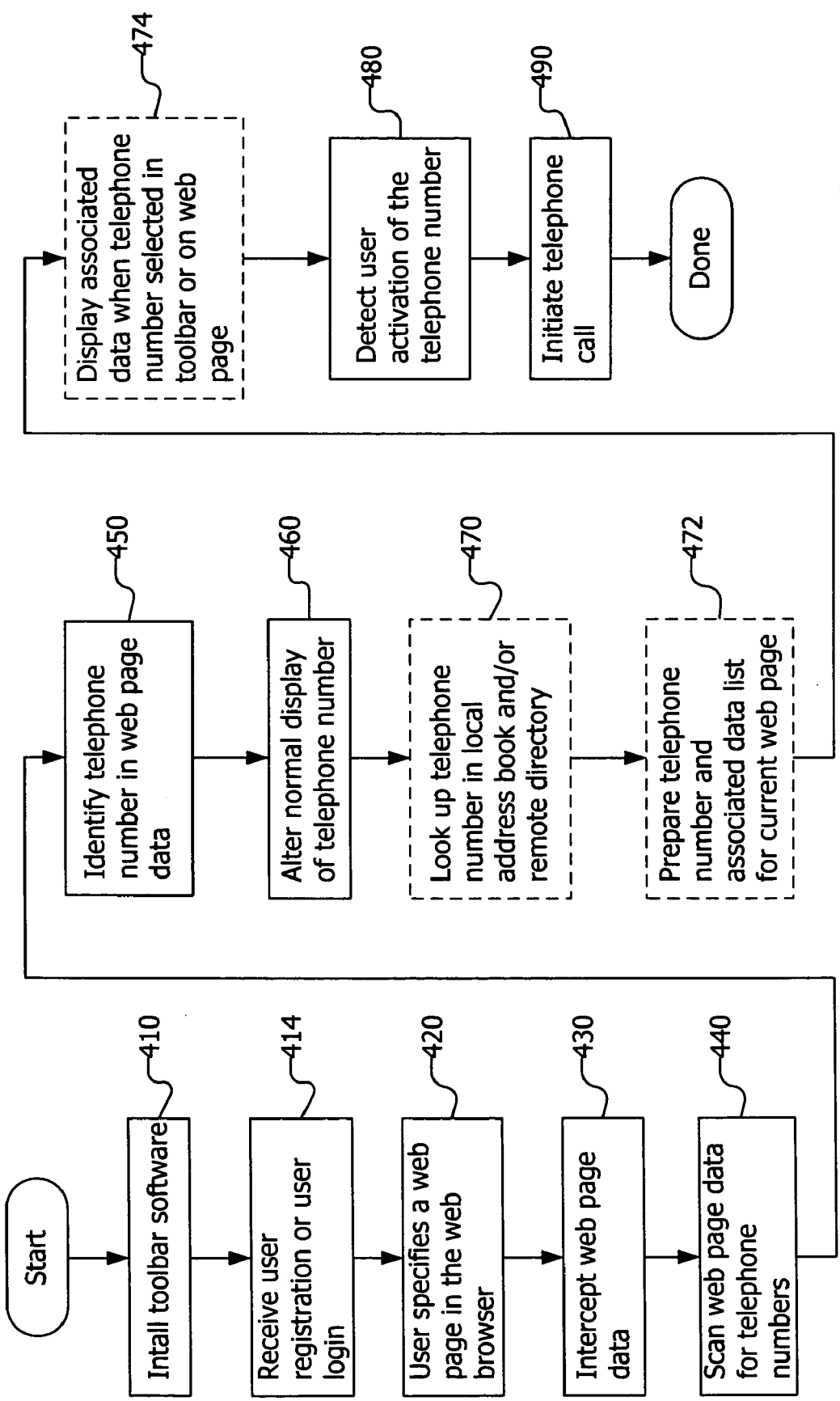
FIG. 4 is a flow chart of a method of telephone call initiation in accordance with the invention.

Referring now to FIG. 4, there is shown a flow chart of a method of telephone call initiation in accordance with the invention.

In a preliminary step, a user may install and configure call initiation toolbar software such as toolbar software 220 described regarding FIG. 2 above, as shown in block 410. The installation may be achieved by accessing an installation website on a web server, by accessing a CD-ROM, and by other techniques. As part of the configuration of the call initiation toolbar software, the call module 224 of the toolbar software 220 may collect a user's telephone number, service or billing authentication information such as a password and/or account number, and/or a login name. The telephone number and service or billing authentication information may be collected separately. The user may specify or select any desired telephone number, such as the telephone number for telephone 175 adjacent the local device 100 shown in FIG. 1, a mobile telephone, a remote telephone, or otherwise. This specified or selected telephone number may be considered the "predefined telephone number."

In addition, as a further preliminary step, the user may register a new account with or login to an existing account with a telephone service provider, as shown in block 414. The telephone service provider operates the server that coordinates the telephone connection between a user and a telephone number based on user selection of a telephone number or associated data occurring in a web page. If the user has an established account, the account, service level and other information may be authenticated. The communication with the server may use TCP/IP. The predefined telephone number may be specified during this registration. When logging in, a predefined telephone number specified earlier during registration is used. In another embodiment, during login and/or when a user activated an identified telephone number, the toolbar software queries the user for a callback telephone number and sets the callback telephone number as the predefined telephone number.

The user may use the web browser to access a website by specifying a web page, as shown in block. In doing so, the toolbar software receives web page data. The toolbar software may intercept web page data directed from a web server to the web browser, as shown in block 430. The web page data may include one or more HTML files, JAVA server pages, scripts, applets, and other files and associated elements, such as graphic and sound files. The toolbar software scans the web page data for telephone numbers, as shown in block 440. The web page data may be parsed or otherwise processed using one or more algorithms for identifying telephone numbers, as shown in block 450. For example, the web page data may be scanned for a series of numerals in the exact pattern "(NNN) NNN-NNNN," where N is a number from zero to nine. Alternatively, a more generic algorithm may search for a series of three or more single digit numbers with no intervening characters except a dash, dots/periods, or matched parentheses. The particular algorithm used may depend on a number of factors, including the degree of desired accuracy, the processing capabilities of the client computer, the desired efficiency or speed, and the types of telephone numbers The normal display of any telephone numbers identified in a web page are altered for conspicuous display, as shown in block 460. In one embodiment, all telephone numbers in a web page are conspicuously displayed. In another embodiment, only telephone numbers found in block 450 are conspicuously displayed. When the telephone numbers are displayed as part of a web page, the telephone numbers are displayed according to an attribute in the telephone number object and/or the toolbar software which renders the telephone numbers conspicuous to a user. The conspicuous displaying may be achieved in a number of ways. In one alternative, a normal display of the data unit may be altered prior to display such that the telephone numbers will be conspicuous. For example, just prior to display of a web page, HTML tags, JavaScript and/or other code or software may be added to a web page data file to created an altered web page data file so that the telephone numbers will be conspicuously displayed by the browser. In addition, the altered web page data file may provide click-to-call or other activation functionality to a conspicuously displayed telephone number. Further, the altered web page may provide balloon or floating data such that when a cursor is passed over a conspicuously displayed telephone number, associated data is temporarily displayed on top of or adjacent to the conspicuously displayed telephone number. The telephone number may also be displayed by the toolbar software in a phone number box in the toolbar when the cursor is passed over the conspicuously displayed phone number on the web page. The format of the tags in an altered web page data file may follow the standard HTML format, may have a custom format, or otherwise. The tags may include a target source or uniform resource identifier or locator (URI or URL) which may determine when and how a telephone call may be initiated.

In a second alternative, immediately after a normal display, the telephone numbers or the entire web page may be redisplayed such that the telephone numbers are conspicuous. In a third alternative, the normal display of the telephone numbers may be overlaid with the conspicuous attributes. Other techniques for achieving conspicuous display of telephone numbers may be used.

A telephone number may be made conspicuous in many ways. For example, the displayed telephone number may have a distinctive color or font, or it may be underlined, bolded, flashing, or highlighted. The telephone number may be displayed such that it appears identical or similar to a hyperlink. The display may be conspicuous at all times, or may be temporary, such as on cursor roll-over.

Further, different types of telephone numbers may have different conspicuous display attributes. For example, local and toll-free telephone numbers may be displayed in one color (e.g., green), long distance telephone numbers may have a different color (e.g., blue), telephone numbers found in a user's address book may be yet another color (e.g., red), and telephone numbers found in a directory listing may be displayed in a further color (e.g., yellow). The kind of conspicuous display, related attributes (such as, for example, color), and their assignment to different classes or groups of telephone numbers may be user customizable.

Blocks 430 through 460 are performed automatically, and may begin and may complete before the web page is displayed. Blocks 430 through 460 may be performed in conjunction with, as a consequence of, or be triggered by a user instruction or event to display the web page, as shown in block 420.

Block 460 may be performed on all telephone numbers within a web page, or may be limited to those telephone numbers having desired qualities, as described in more detail below with regard to blocks 470 through 474.

The user may be provided with options to control which web pages or web sites are processed as set forth in blocks 440 through 460. This may be useful if the display of a web page must remain true. For example, a user may specify that web pages from a particular website or domain name, or having a particular file format, or having particular key words associated with them, should be skipped. Also, web page files may include an indicator that their display should not be altered.

Identified telephone numbers may be looked up in a local address book and/or a remote address book, and/or a directory, as shown in block 470, depending on the particular embodiment. The local address book may be maintained by PIM 222 of toolbar software 220 and/or by a contact manager or other application program external to the toolbar software 220. A list or other data structure of identified telephone numbers and any associated data is prepared for the current web page, as shown in block 472. The associated data may include names (people, companies, schools, and others), email addresses, street addresses, mailing addresses, birthdays, and other information. The associated data may be displayed when a user selects, activates or "mouses over" a telephone number, as shown in block 474. The user may customize which associated data should be displayed. The display may occur in the toolbar pane and/or on or over the web page. The conspicuous display described above regarding block 460 may also include an associated data menu, so that when a user uses a mouse or other cursor control device to click on the telephone number with a secondary mouse button, a menu of options may be displayed adjacent the telephone number. The options may be to call the person or entity specified by associated data, to send email to an email address associated with the telephone number, to turn off conspicuous display of the telephone number or any telephone number corresponding to associated data, and others.

In one embodiment, a do not call list on a remote server may be consulted by the toolbar software. When an identified telephone number is located in the do not call list, the identified telephone number may not be conspicuously displayed, may be obstructed from view by overwriting other text or graphics, or may be displayed in a special color or in a special manner. When an identified telephone number is found in a do not call list, the toolbar software may not allow a user to place a call to the telephone number. In this way, the toolbar software may block access to telephone numbers appearing in remote do not call lists. The do not call features described in this paragraph may be user customizable.

The activities performed in blocks 470, 472 and 474 are optional and are not required for the functioning of the method described.

Once conspicuously displayed, the user may wish to call a telephone number. As described herein, calling a telephone number means placing a telephone call between the predefined telephone number and the conspicuously displayed telephone number. A user may activate a conspicuously displayed telephone number to call it. This activation may be achieved by clicking on or otherwise activating a conspicuously displayed telephone number presented on a web page in the web browser. Alternatively, an icon presented in a call initiation software toolbar may be clocked on or otherwise activated after a conspicuously displayed telephone number has been selected by the user.

The activation by the user of a conspicuously displayed telephone number may be detected, as shown in block 480.

The term "activated telephone number" refers to the activated, displayed telephone number. Where activation is performed directly through the toolbar software 220, recognition may be inherent to the telephone call module 224. The telephone call module 224 of the toolbar software 220 may monitor the web browser software 210 of the operating system 240 for activation of a phone number object. This may be achieved using facilities of the operating system 240.

A telephone call between the predefined telephone number and the activated selected telephone number is initiated, as shown in block 490. The telephone call module 224, in response to recognizing the activation of the displayed telephone number causes a call initiation signal to be sent to the switch 150 via the gateway 140. The call initiation signal instructs the switch 150 to initiate a multi-leg telephone call with the predefined telephone number as one of the legs. Another leg is the activated telephone number. In block 490, the telephone call module 224 may cause the user to be prompted to enter, confirm or modify the predefined telephone number and/or the initiation request.

The telephone call may connect the user's telephone 175 and one or more other telephones 170 via the PSN 160. The telephone call module 224 may initiate the call, for example, by calling a service of the operating system 240 or by interacting with communications software included with the operating system 240 and/or the server 130.

The telephone call module 224 may send a call initiation message for call initiation in block 490. The call initiation message may be an IP-based message for triggering call initiation. The telephone call module 224 may send the call initiation message directly to the switch 150, in which case the call initiation signal is the call initiation message. Alternatively, the telephone call module 224 may send the call initiation message to some other device, such as, for example, the server 130, which device causes the call initiation signal to be sent to the switch 150.

The call initiation message may include the predefined telephone number and the activated telephone number. Alternatively, the call initiation message may include identifiers by which the predefined telephone number and/or the activated telephone number may be obtained, looked up, derived, or otherwise determined. For example, the call initiation message may include the activated telephone number and an identifier of the user, and the identifier of the user may be used to look up the user's telephone number. Likewise, the call initiation message may include an identifier which may be used to retrieve the activated telephone number. The switch 150 may retrieve telephone numbers, for example, from a database in the server 130. Similarly, the server 130 may use the identifiers to retrieve the telephone numbers from its own database.

In an embodiment where the call initiation message is sent to the server 130, the server 130 receives the call initiation message and may then transmit the call initiation signal to the switch 150 to trigger the call. As such, the server 130 may play an intermediary role. In this way, a dedicated TCP connection may be opened to authenticate the user and start a call session with the server 130. Using a communication protocol, the server 130 may communicate the call request to the switch 150 or the gateway 140 to initiate the call. The TCP connection may be kept open during the entire period of the call before it is disconnected. Asynchronous call status messages may be processed as they arrive.

The call initiation message may be one or more HTTP requests, HTTPS requests or may use another communications protocol. The HTTP/HTTPS requests may be used, for example, to authenticate the user and start a call session with the server 130. The server 130 may communicate these requests to the switch 150 or the gateway 140 to initiate the call. The server 130 may poll the telephone call module 220 at pre-defined intervals for call status requests.

Alternatively, the telephone call module 224 may initiate the telephone call using SIP to send the call initiation message on the data network 120. With this alternative, a telephone on a VoIP network may be bridged with another telephone on the VoIP network or a telephone 170 on the PSN 160.

The method may be used for initiating two-party calls and conference calls. Thus, where the user desires to have a conference call, the user may use the input device to activate or select one or more additional telephone numbers in the browser window or by a user interface provided by the toolbar software 220. The telephone call module 224 may recognize the activation of the additional telephone numbers and signal the switch 150 to initiate a conference call. There may be a separate signal for each telephone number, or the signals may be joined in a single message to the switch 150.

After the telephone call module 224 has signaled for call initiation, the telephone call module 224 may receive call status information from the switch 150. The call status information may be, for example, "connected," "dropped," "busy" and "closed." The switch 150 may send the call status information directly to the telephone call module 224, or the telephone call module 224 may receive the call status information indirectly. The telephone call module 224 may cause the call status information to be provided to the user via the display of an icon in the call initiation toolbar or a text area in the call initiation toolbar. In addition, the telephone call module 224 may cause the call status information to be displayed in a pop-up window on the display 101.

Figure 5:
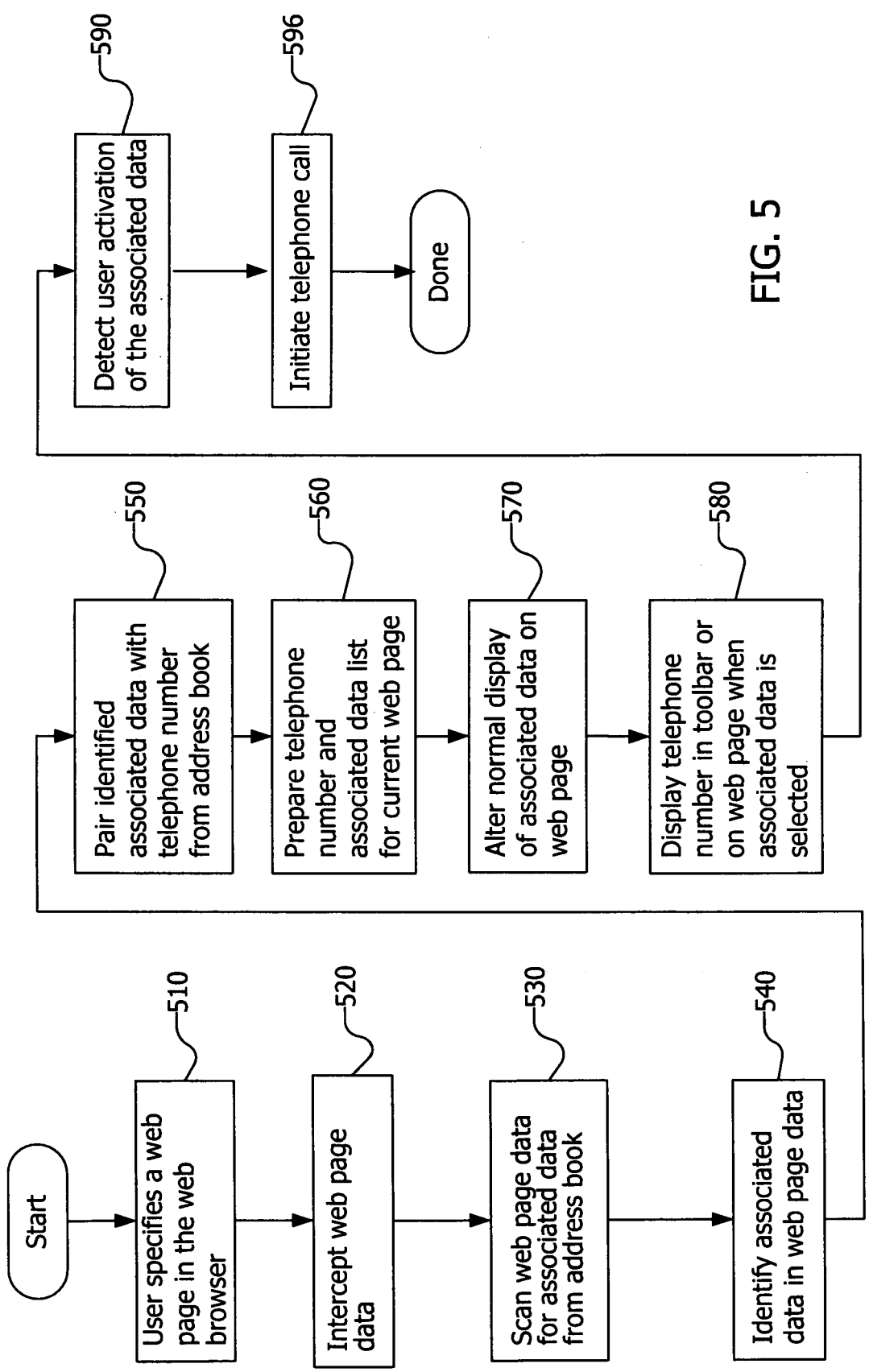
FIG. 5 is a flow chart of a method of telephone call initiation based on identification of a data associated with a telephone number in accordance with the invention.

Referring now to FIG. 5, there is shown a flow chart of a method of telephone call initiation based on identification of a data item associated with a telephone number in accordance with the invention. The method of FIG. 5 is similar to the method of FIG. 4, and many aspects of the method of FIG. 4 apply to the method of FIG. 5.

In a preliminary step, a user may install and configure call initiation toolbar software as described regarding FIG. 4 above.

The user may use the web browser to access a website by specifying a web page, as shown in block 510. In doing so, the toolbar software receives web page data. The toolbar software may intercept web page data directed from a web server such as web server 136 to the web browser, as shown in block 520. The toolbar software scans the web page data for associated data from an address book accessible by or included with toolbar software 220, as shown in block 530. That is, associated data such as email addresses; company, personal and organizational names; and other information stored in PIM 222 and/or another contact manager, address book, or other application program included in or accessible to the toolbar software 220 is sought in web page data files. The web page data may be parsed or otherwise processed using one or more algorithms for identifying associated data, as shown in block 540. The particular algorithm used may depend on a number of factors, including the degree of desired accuracy, the processing capabilities of the client computer, the desired efficiency or speed, and the types of data to be identified Identified associated data is paired with a telephone number from the address book included or accessible with the toolbar software 220, as shown in block 550.

Blocks 530, 540 and 550 may be performed on all or only a limited number of types of associated data per web page. Blocks 530, 540 and 550 may be performed on all associated data identified within a web page data file, or may be limited to associated data having desired qualities, such as street address, company name, email address, contact name, and others. The user may be provided with options to control which web pages or web sites are processed as set forth in Blocks 530, 540 and 550 in a similar manner as discussed above regarding FIG. 4.

A list or other data structure of identified associated data and corresponding telephone numbers is prepared for the current web page, as shown in block 560.

Blocks 520 through 560 are performed automatically, and may begin or may be completed before the web page is displayed. Blocks 510 through 560 may be performed in conjunction with, as a consequence of, or be triggered by a user instruction or event to display the web page, as shown in block 510.

The normal display of identified associated data in a web page is altered for conspicuous display, as shown in block 570. When the identified associated data are displayed as part of a web page, the identified associated data are displayed according to an attribute which renders the identified associated data conspicuous to a user. The conspicuous displaying may be achieved in a number of ways as described above regarding FIG. 4, such as by altering a web page data file.

The altered web page data file may provide click-to-call or other activation functionality to a conspicuously displayed associated data item. The altered web page may provide balloon or floating data such that when a cursor is passed over a conspicuously displayed associated data item or the conspicuously displayed associated data is selected, a corresponding telephone number is temporarily displayed on top of or adjacent to the conspicuously displayed telephone number, as shown in block 580. In addition, the corresponding telephone number may be displayed by the toolbar software in a phone number box in the toolbar when the cursor is passed over the conspicuously displayed associated data on the web page or when the conspicuously displayed associated data is selected, as shown in block 580.

The conspicuous display may also include an associated menu, so that when a user uses a mouse or other cursor control device to click on the identified associated data with a secondary mouse button, a menu of options may be displayed adjacent the associated data. The options may be to call the person or entity specified by associated data, to send email to an email address associated with the identified associated data, to turn off conspicuous display of the identified associated data, and others.

Further, different types of identified associated data may have different attributes. For example, names in a personal group may be displayed in one color (e.g., green), names in a business group may have a different color (e.g., blue), and other identified associated data found in a user's address book may be yet another color (e.g., red), and so on.

In one embodiment, a do not call list on a remote server may be consulted by the toolbar software. When the telephone number corresponding with identified associated data is located in the do not call list, the identified associated data may not be conspicuously displayed, may be obstructed from view by overwriting other text or graphics, or may be displayed in a special color or in a special manner. When a corresponding telephone number is found in a do not call list, the toolbar software may not allow a user to place a call to the telephone number. In this way, the toolbar software may block access to telephone numbers appearing in remote do not call lists. Similarly, a third party's or company's do not call list in a database on a remote web server may be consulted to determine whether associated data such as a name and/or address included in identified associated data is found. If so, the toolbar software may not allow a user to place a call to the telephone number corresponding to the identified associated data, and may obstruct the associated data from view by overlaying the associated data with text or graphics or otherwise blocking the associated data from viewing. The features described in this paragraph may be user customizable.

When the identified associated data is conspicuously displayed in a web page and/or in a call initiation toolbar, the user may wish to call a telephone number. A user may activate an identified associated data item to call a corresponding telephone number. This activation may be achieved by clicking on or otherwise activating a conspicuously displayed identified associated data number presented on a web page in the web browser. Alternatively, an icon presented in a call initiation software toolbar may be clicked on or otherwise activated after a conspicuously displayed telephone number has been selected by the user.

The activation by the user of a conspicuously displayed identified associated data item may be detected, as shown in block 590. The term "activated telephone number" will be used to refer to the telephone number corresponding to the activated, displayed identified associated data. Where activation is performed directly through the toolbar software 220, recognition may be inherent to the telephone call module 224. The telephone call module 224 of the toolbar software 220 may monitor the web browser software 210 or the operating system 240 for activation of an identified associated data object.

A telephone call between the predefined telephone number and the activated selected telephone number is initiated, as shown in block 596. The initiation may proceed as described above regarding block 490 of FIG. 4.

The methods described above regarding FIGS. 4 and 5 may be combined. That is, a method may include scanning a web page for both telephone numbers and associated data, identifying telephone numbers and associated data in the web page, pairing the telephone numbers and associated data with information stored in an address book or PIM, and so on.

A User Interface

Figure 6:
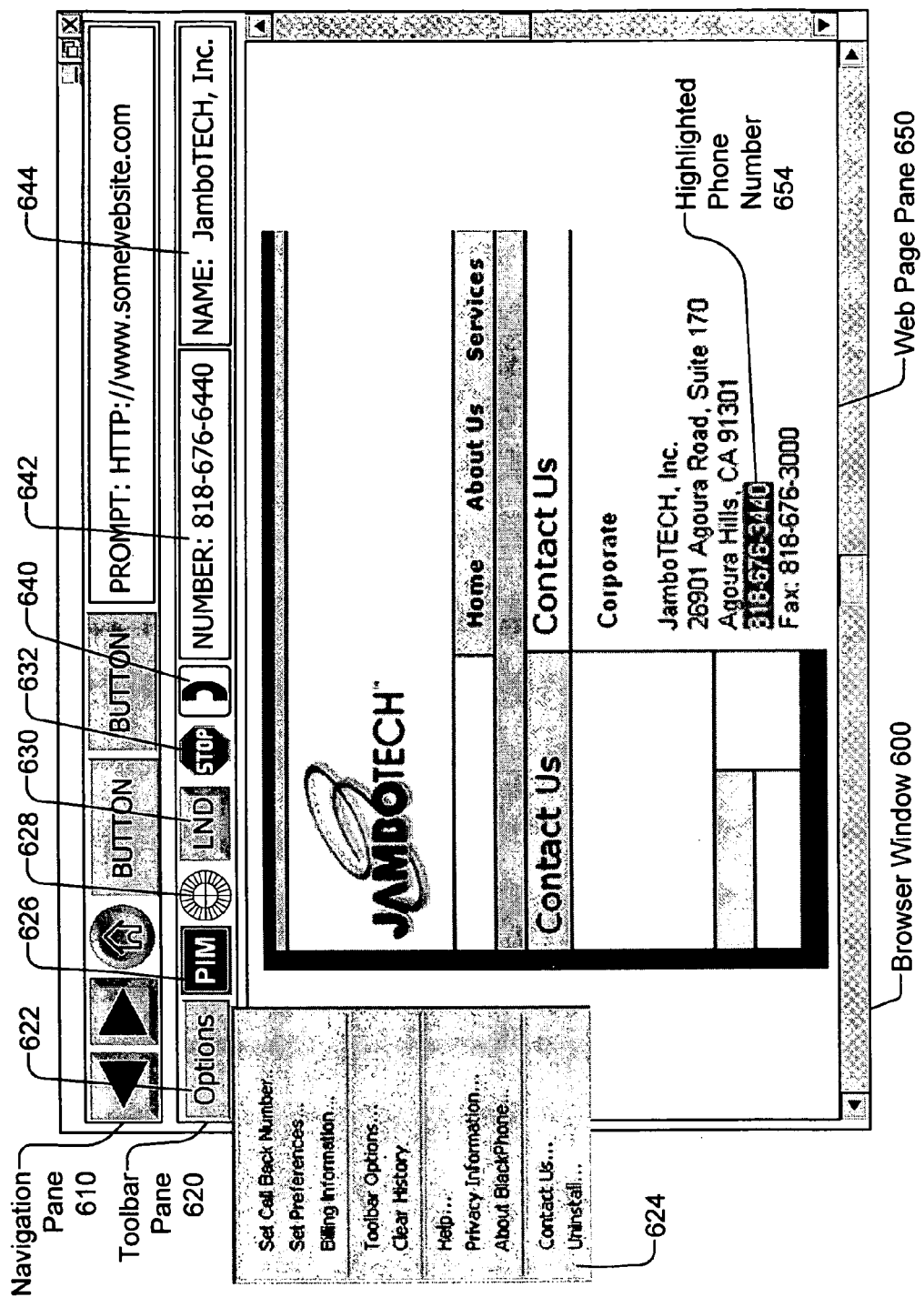
FIG. 6 is an Internet browser window including a toolbar that may be used to initiate telephone calls in accordance with the invention.

Referring now to FIG. 6, there is shown an Internet browser window including a toolbar that may be used to initiate telephone calls in accordance with the invention.

As described above, after toolbar software 220 has been installed, an automated telephone call initiation toolbar pane 620 is presented in a web browser window 600. The toolbar pane may appear between the navigation pane 610 and a web page pane 650. The location of the toolbar pane may be user controllable such that the user may move the toolbar pane to be vertically aligned adjacent to either side of the browser window or be horizontally flush with the bottom of the browser window 600 such that the toolbar pane is situated between the bottom of the web page pane 650 and the bottom of the browser window 600.

The navigation pane 610 may be a web browser navigation pane such as those provided by, for example, Microsoft Internet Explorer and Netscape Navigator. The navigation pane 610 typically includes forward and back navigation buttons, a home button, and a text entry area for specifying an Internet web page, as well as other buttons.

The toolbar pane 620 includes various user interface items that allow for a user to take advantage of the functionality of the automated call initiation systems and methods described above. Example user interface items include, but are to limited to, buttons, sliders, scroll bars, scroll wheels, drop down menus, walking menus, text entry boxes, as well as animated graphics, and others. The toolbar pane 620 may include a button 622 that when activated allows causes a menu 624 to be displayed. The menu 624 allows a user to configure and/or customize the automated call initiation system. When configuring the automated call initiation system, the user may specify one or more telephone numbers that the toolbar software should use in placing telephone calls which may be referred to as "call back numbers." A call back number is the same as the predefined telephone number discussed above. Via the menu 624, the user may specify various features of the toolbar software, such as the location of an address book that may be external to the toolbar software, the colors and fonts used in the toolbar pane 620, the location of the toolbar pane 620, domain names, websites, and/or URIs and URLs for which the telephone numbers and/or associated data should not be identified, and others.

When functioning, the toolbar software 220 that executes to display toolbar pane 620 identifies telephone numbers and/or associated data in web pages displayed in the web browser window 600. For example, when a web page is retrieved by the web browser, the toolbar software may alter the display attributes of an identified telephone number and display the telephone number in a conspicuous manner, such as, for example, by highlighting the telephone number, as shown by highlighted telephone number 654 in web page pane 650. In addition, when the toolbar software identifies a single telephone number, the telephone number may be placed in a text area in the toolbar pane, such as text box 642. Similarly, when the toolbar software identifies multiple telephone numbers in a web page, a user selected or activated telephone number may be displayed in text box 642. The toolbar software may display a telephone number in text box 642 whenever a cursor is passed over an identified telephone number. Further, when multiple telephone numbers are identified on a web page, the toolbar software may place them in a menu accessible from the toolbar pane 620.

In addition, when the toolbar software identifies a telephone number, the toolbar may associate a name, email address and/or other contact information or personal information with the identified telephone number. The toolbar software may display this associated data in a text box in the toolbar pane 620 adjacent to where an activated telephone number is displayed, such as in text box 644. In addition, the toolbar software may also cause a floating text bubble containing the associated data to be displayed adjacent to an identified telephone number whenever a cursor is placed over the identified telephone number. Further, when multiple telephone numbers are identified on a web page, the toolbar software may place the telephone numbers and associated data in a menu accessible from the toolbar pane 620.

To place a telephone call, the toolbar software may allow a user to click on or otherwise activate a conspicuously displayed telephone number or conspicuously displayed associated data. This activation will cause the call module in the toolbar software to establish a two leg call between the predefined telephone number the user entered during configuration and the activated telephone number or the telephone number corresponding to the activated associated data. Similarly, after a user has selected an identified telephone number or identified associated data, the user may initiate a telephone call by clicking on or otherwise activating the telephone button 640. In addition, a telephone call may be placed between the predefined telephone number and a telephone number by a user selecting a telephone number from a menu of identified telephone numbers included in a menu (which may also include associated data). Multi-party calls may also be supported by allowing a user to specify two or more telephone numbers. Further, a button or other user interface item may be provided to allow an additional party to be added to or conference in on a call.

In addition, when a call is placed using the toolbar software, a remote database containing the call history of the user of the toolbar software may be updated. The remote database may provide information accessible to the user of the toolbar software and/or to a company or entity. The company or other entity may be a company that is the destination of the telephone call placed with the toolbar software, may be a company or entity that employs the user, or may be another third party. When information is provided to remote third parties about placed telephone calls, the information may be provided as call data records (CDRs).

While, during and/or after a call is placed, the call status may be displayed in a text display box in the toolbar pane 620, or may be made available by activating a button or menu item on the toolbar pane 620.

Button 626 may be used to specify and access contact information such as that provided by an address book, contact manager, or PIM. Activating button 626 may invoke PIM software, contact manager software, or address book software included in the toolbar software. The contact information may have been created by and/or may be retrieved by the toolbar software. One or more internal and/or external address books and/or contact lists may also be accessed. The external address books may be local and/or remote to the local device on which the web browser is running. In another embodiment, activating button 626 may invoke PIM software, contact manager software, or address book software external to the toolbar software. In this embodiment, the toolbar software may access the contact information stored by the external software, and may actively communicate with the external software. Example external contact information software programs include, for example, Microsoft Outlook, Palm Desktop software, and others.

Button 628 may be used to place the call initiation features on or off, to make them active or inactive. That is, button 628 may act as a switch to place the conspicuous display of telephone numbers and/or associated data on web pages on and off. Button 628 may be used to stop and start the identifying and conspicuous display of telephone numbers and/or associated data on web pages. The button 628 may itself change color, shading or attribute to signify whether the conspicuous display features are set on or off.

Button 630 may be used to stop a phone call that is being placed or that is already in progress. Another button (not shown) or an item on menu 624 may be included to shut down the call initiation toolbar pane 620.

In addition, pull down menus, text display boxes, sliders, and other user interface items may also be included in the toolbar pane 620 to provide various user interface functionality. Additional and fewer features may be grouped or otherwise iterated in the toolbar pane 620 using various user interface items. The described features, additional and fewer features may be grouped or otherwise iterated in the menu 624 and/or one or more additional or replacement menus.

The toolbar software may also include a last number dialed (LND) button 630 which allows a user to easily call the last number dialed and establish a telephone call between the last number dialed and the predefined telephone number. In another embodiment, the LND button 630 may be replaced with or augmented with a menu (or other user interface item) of previously dialed telephone numbers.

The toolbar software may further include a user interface item such as a button which allows a user to block or otherwise obstruct access to placing calls to telephone numbers on a do not call list. The user interface may allow a user to specify the location or owner of one or more do not call lists to be consulted by the toolbar software. This may be achieved by pull-down menus and text entry boxes, as well as by other user interface items.

The toolbar software may further include a user interface item such as a button which allows a user to record telephone calls on the computing device on which the toolbar software is executing, or on a remote computing device, or local or remote storage device.

The toolbar software may also include the ability to provide video phone calls. As such, the toolbar software interface may include a user interface item such as a button to allow for activating a video phone call. The toolbar software may allow via pull-down menus or other user interface items the ability to select video, audio and/or combined video and audio capturing and playing devices used during video phone calls.

In one embodiment, when the toolbar software is used to place a telephone call, a company or other third party corresponding to the destination telephone number may be charged any fees, tolls or other expenses incurred in connecting the telephone call.

In one embodiment, a short advertisement may be played to a user of the toolbar software while a call is being connected and/or prior to the connection of a telephone call via the toolbar software. The subject of the advertisement may be based on the area code of the predetermined telephone number, may be based on a company that corresponds to the identified or destination telephone number, or may be part of a national advertising campaign.

Although exemplary embodiments of the invention have been shown and described, it will be apparent to those having ordinary skill in the art that a number of changes, modifications, or alterations to the invention as described herein may be made, none of which depart from the spirit of the invention. All such changes, modifications and alterations should therefore be seen as within the scope of the invention.

It is claimed:

1. A method of telephone call initiation via toolbar software executing with an Internet web browser on a computing device, the method comprising:

the toolbar software causing a toolbar to be displayed in the Internet web browser on the computing device;

the toolbar software identifying telephone numbers included in a web page requested by a user of the Internet web browser;

the toolbar software causing the Internet web browser to conspicuously display the identified telephone numbers in the toolbar automatically when the web page is displayed;

the toolbar software recognizing activation by the user of one of the conspicuously displayed identified telephone numbers included in the web page as an activated telephone number;

the toolbar software sending a call initiation message over a data network to a switch instructing the switch to initiate a two leg telephone call over a public switched telephone network between a predefined telephone number and the activated telephone number in response to the recognizing, wherein the predefined telephone number is associated with a first telephone distinct from and proximate to the computing device that runs the Internet web browser, the first telephone coupled with the public switched telephone network, and wherein the activated telephone number is associated with a second telephone distinct from the computing device and distinct from the first telephone;

wherein the predefined telephone number is a web browser user telephone number;

wherein the web browser user telephone number is for an adjacent telephone proximately near to where the user is accessing the web browser;

wherein the adjacent telephone is a cellular telephone.

2. The method of claim 1 wherein the adjacent telephone is connected to the public switched telephone network.

3. The method of claim 1 wherein the toolbar software requests the predefined telephone number during user registration with the toolbar software.

4. The method of claim 1 wherein the toolbar software requests the predefined telephone number when a user logs in to the toolbar software.

5. The method of claim 1 wherein the initiating comprises:
the toolbar software requesting a callback telephone number from the user and assigning the callback number as the predefined telephone number.

6. The method of claim 1 further comprising:
the toolbar software receiving call status information;
the toolbar software providing the call status information to the user.

7. The method of claim 6 wherein the providing comprises:
the toolbar software displaying the call status information in the toolbar.

8. The method of claim 1 wherein the toolbar includes a button to allow a user to turn the conspicuously displaying on and off.

9. The method of claim 1 wherein the toolbar includes a user interface item to allow a user to provide the predefined telephone number.

10. The method of claim 1 wherein the toolbar includes a user interface item to list the identified telephone numbers.

11. The method of claim 1 wherein the call initiation message includes the predefined telephone number and the displayed telephone number.

12. The method of claim 1 wherein the sending the call initiation message comprises:
the toolbar software opening a TCP connection to authenticate the user and start a session over the data network with a server.

13. The method of claim 1 wherein the call initiation message comprises one or more HTTP requests.

14. The method of claim 1 wherein the call initiation message comprises one or more SIP messages.

15. A method of telephone call initiation via toolbar software executing with an Internet web browser on a computing device, the method comprising:
the toolbar software causing a toolbar pane to be displayed in the Internet web browser on the computing device;
the toolbar software intercepting web page data directed to the Internet web browser;
the toolbar software scanning the web page data for associated data items included in an address book stored on the computing device and included with or accessible to the toolbar;
the toolbar software identifying the associated data items found in the web page data as found data items;
the toolbar software pairing a telephone number from the address book with each of the found data items;
the toolbar software preparing a list of found data items and corresponding telephone numbers for the web page;
the toolbar software altering the normal display of the found data items to make the found data items conspicuously displayed in the toolbar automatically on a web page in which the data is included;
the toolbar software recognizing the activation of one of the found data items;
the toolbar software sending a call initiation message over a data network to a switch instructing the switch to initiate a telephone call over a public switched telephone network between a predefined telephone number and the telephone number corresponding to an activated found data item, wherein the predefined telephone number is associated with a first telephone distinct from and proximate to a computing device that runs the Internet web browser, the first telephone coupled with the public switched telephone network, and wherein the telephone number corresponding to the activated found data item is associated with a second telephone distinct from the computing device and distinct from the first telephone;
wherein the predefined telephone number is a web browser user telephone number;
wherein the web browser user telephone number is for an adjacent telephone proximately near to where the user accesses the web browser;
wherein the adjacent telephone is a cellular telephone.

16. The method of claim 15 wherein the adjacent telephone is connected to the public switched telephone network.

17. The method of claim 15 wherein the toolbar software requests the predefined telephone number during user registration with the toolbar software.

18. The method of claim 15 wherein the toolbar software requests the predefined telephone number when a user logs in to the toolbar software.

19. The method of claim 15 wherein the initiating comprises:
the toolbar software requesting a callback telephone number from the user and assigning the callback number as the predefined telephone number.

20. The method of claim 15 further comprising:
the toolbar software receiving call status information
the toolbar software displaying the call status information in the toolbar pane.

21. The method of claim 15 wherein the toolbar pane includes a user interface item to allow a user to set the altering of the found data items in the web page to be on and off.

22. The method of claim 15 wherein the toolbar pane includes a user interface item to allow a user to provide the predefined telephone number.

23. The method of claim 15 wherein the toolbar pane includes a user interface item to list the found data items.

24. A computing device comprising computer software distinct from a web browser and to operate as a toolbar in the web browser, the computer software having instructions for causing the computing device to perform operations comprising:
identifying telephone numbers included in a web page requested by a user of the web browser;
conspicuously displaying the identified telephone numbers in the toolbar automatically when the web page is displayed;
recognizing activation by the user of one of the conspicuously displayed identified telephone numbers included in the web page as an activated telephone number;
sending a call initiation message over a data network to a switch instructing the switch to initiate a two leg telephone call over a public switched telephone network between a predefined telephone number and the activated telephone number in response to the recognizing, wherein the predefined telephone number is associated with a first telephone independent from and proximate to the computing device that runs the web browser, the first telephone coupled with the public switched telephone network, and wherein the activated telephone number is associated with a second telephone independent from the computing device and distinct from the first telephone;

wherein the predefined telephone number is a web browser user telephone number;

wherein the web browser user telephone number is for an adjacent telephone proximately near to where the user is accessing the web browser;

wherein the adjacent telephone is a cellular telephone.

25. The computing device of claim 24 wherein the adjacent telephone is connected to the public switched telephone network.

26. The computing device of claim 24 wherein the toolbar includes a button to allow a user to turn the conspicuously displaying on and off.

27. The computing device of claim 24 wherein the toolbar includes a user interface item to allow a user to provide the predefined telephone number.

28. The computing device of claim 24 wherein the toolbar includes a user interface item to list the identified telephone numbers.

29. A computing device comprising computer software distinct from a web browser and to operate as a toolbar in the web browser, the computer software having instructions for causing the computing device to perform operations comprising:

intercepting web page data directed to the web browser;

scanning the web page data for associated data items included in an address book stored on the computing device and included with or accessible to the toolbar;

identifying the associated data items found in the web page data as found data items;

pairing a telephone number from the address book with each of the found data items;

preparing a list of found data items and corresponding telephone numbers for the web page;

altering the normal display of the found data items to make the found data items conspicuously displayed in the toolbar automatically on a web page in which the found data is included;

recognizing the activation of one of the found data items;

sending a call initiation message over a data network to a switch instructing the switch to initiate a telephone call over a public switched telephone network between a predefined telephone number and the telephone number corresponding to an activated found data item, wherein the predefined telephone number is associated with a first telephone independent from and proximate to a computing device that runs the web browser, the first telephone coupled with the public switched telephone network, and wherein the telephone number corresponding to the activated found data item is associated with a second telephone independent from the computing device and distinct from the first telephone;

wherein the predefined telephone number is a web browser user telephone number for an adjacent telephone proximately near to where the user is accessing the web browser;

wherein the adjacent telephone is a cellular telephone.

30. The computing device of claim 29 wherein the adjacent telephone is connected to the public switched telephone network.

31. The computing device of claim 29 further comprising:

requesting a callback telephone number from the user and assigning the callback number as the predefined telephone number.

32. The computing device of claim 29 wherein the toolbar includes a user interface item to allow a user to set the altering of the found data items in the web page to be on and off.

33. The computing device of claim 29 wherein the toolbar includes a user interface item to allow a user to provide the predefined telephone number.

34. The computing device of claim 29 wherein the toolbar includes a user interface item to list the found data items.

* * * * *